US008576179B2

(12) United States Patent
Walliser et al.

(10) Patent No.: US 8,576,179 B2
(45) Date of Patent: Nov. 5, 2013

(54) SLIDER FORM FACTOR DEVICES AND METHODS FOR MORPHING INDICIA VISIBLE THROUGH A TRANSPARENT MEMBER

(75) Inventors: Marc R. Walliser, Chicago, IL (US); Claudio Santiago Ribeiro, Evanston, IL (US); John B. Van Den Nieuwenhuizen, Cupertino, CA (US)

(73) Assignee: Motorola Mobility LLC, Libertyville, IL (US)

( * ) Notice: Subject to any disclaimer, the term of this patent is extended or adjusted under 35 U.S.C. 154(b) by 339 days.

(21) Appl. No.: 12/323,559

(22) Filed: Nov. 26, 2008

(65) Prior Publication Data

US 2010/0130271 A1 May 27, 2010

(51) Int. Cl.
G06F 3/041 (2006.01)
(52) U.S. Cl.
USPC ........................................ 345/173; 455/575.4
(58) Field of Classification Search
None
See application file for complete search history.

(56) References Cited

U.S. PATENT DOCUMENTS

| 6,230,028 | B1 * | 5/2001 | Shirakawa | ..................... 455/566 |
|---|---|---|---|---|
| 6,282,436 | B1 | 8/2001 | Crisp | |
| 6,415,138 | B2 * | 7/2002 | Sirola et al. | ................... 455/90.1 |
| 6,748,249 | B1 * | 6/2004 | Eromaki et al. | ........... 455/575.4 |
| 6,892,082 | B2 * | 5/2005 | Boesen | ....................... 455/575.3 |
| 7,006,077 | B1 | 2/2006 | Uusimaki | |
| 7,076,058 | B2 | 7/2006 | Ikeuchi et al. | |
| 7,388,578 | B2 * | 6/2008 | Tao | ................................ 345/173 |
| 7,466,994 | B2 * | 12/2008 | Pihlaja et al. | ................. 455/566 |
| 7,522,945 | B2 * | 4/2009 | Kilpi et al. | ................. 455/575.1 |
| 7,620,174 | B1 * | 11/2009 | Bick | ......................... 379/433.01 |
| 7,880,724 | B2 * | 2/2011 | Nguyen et al. | ................. 345/168 |
| 2005/0083642 | A1 * | 4/2005 | Senpuku et al. | .............. 361/681 |
| 2005/0208799 | A1 * | 9/2005 | Oda | ................................ 439/135 |
| 2008/0119248 | A1 * | 5/2008 | Nissen et al. | ............... 455/575.4 |

* cited by examiner

*Primary Examiner* — William Boddie
*Assistant Examiner* — Carolyn R Edwards
(74) *Attorney, Agent, or Firm* — Gary J. Cunningham

(57) ABSTRACT

Disclosed are devices and methods of a slider form factor device having a transparent member supported by its sliding body, and a display module supported by its main body. The transparent member of the sliding body is on top of the display module of the main body in the open position and in the closed position. The transparent member is configured to transmit light received from the display module therethrough. The transparent member provides a morphing effect as light emitted by the display module providing indicia is transmitted through the transparent member, the indicia exhibited through the transparent member changing from first indicia to different indicia depending upon the mode of the device. In the open position, the lower portion of the display module can exhibit a keypad while the top portion of the display module can provide indicia visible through the transparent member of the sliding body.

14 Claims, 3 Drawing Sheets

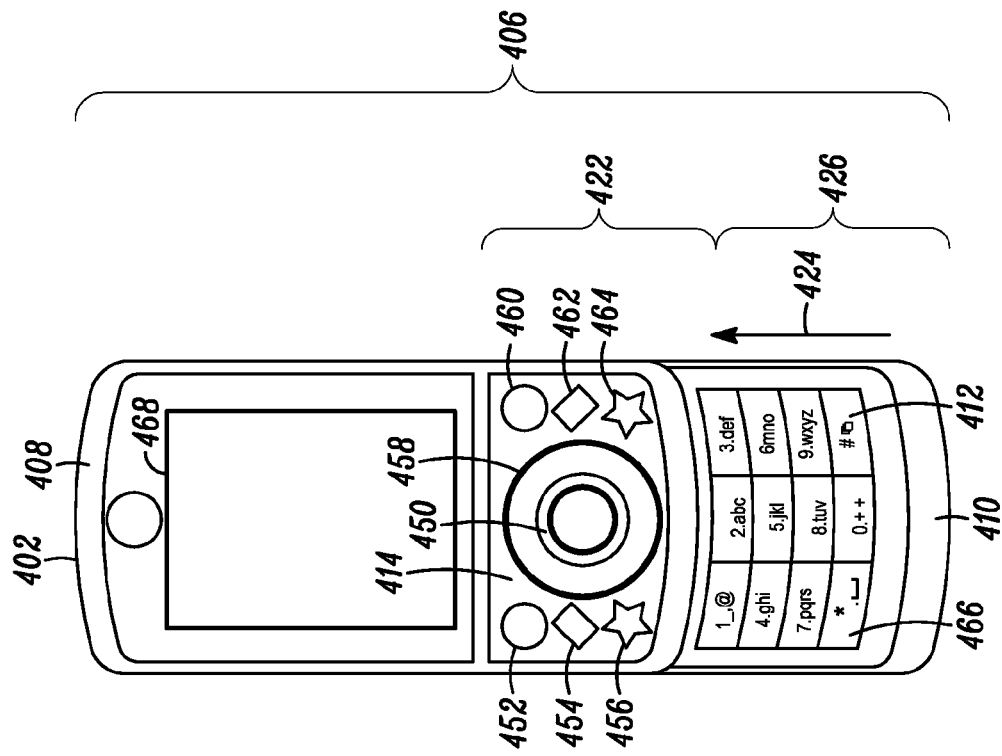
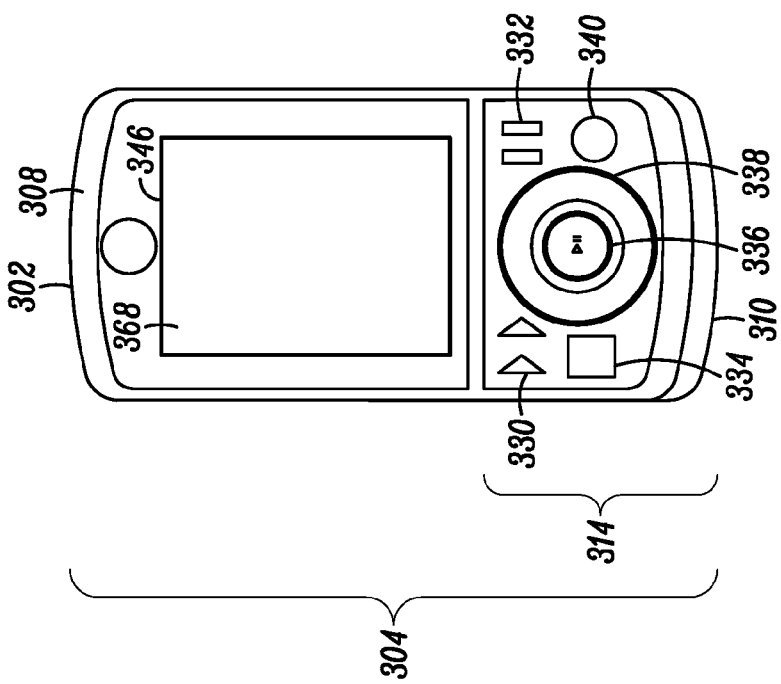
FIG. 4
FIG. 3

SLIDER FORM FACTOR DEVICES AND METHODS FOR MORPHING INDICIA VISIBLE THROUGH A TRANSPARENT MEMBER

FIELD

Disclosed are slider form factor devices and methods of a slider form factor device configured for a morphing effect, and more particularly a device including a sliding body having a transparent member to transmit light therethrough from a display module of the main body.

BACKGROUND

The makers of mobile communication devices are increasingly adding functionality to their devices. For example, cellular telephones include features such as still and video cameras, video streaming and two-way video calling, email functionality, Internet browsers, music players, FM radios with stereo audio and organizers. While there is a trend toward the inclusion of more features and improvements for current features, there is also a trend toward smaller mobile communication devices. As mobile communication device technology has continued to improve, the devices have become increasingly smaller. Fewer and/or smaller hardware and software components are therefore desirable when adding new features and making improvements to the current features in the smaller devices. Fewer hardware components may provide a cost benefit to the consumer.

Manufacturers constantly strive to differentiate their products from those of others available in the same market. In the mobile communication device market a desirable design feature is a morphable, smart or stealth display, keypad, button, key or indicator which may be illuminated when a particular function, mode or application is active and otherwise darkened. To simplify a user interface of a device to include particular features of interest, a morphing effect typically blackens all or certain portions of a display, keypad, button, key or indicator, leaving illuminated those of interest.

BRIEF DESCRIPTION OF THE DRAWINGS

FIG. 3 illustrates an embodiment of a slider form factor device in a closed position;

FIG. 4 illustrates an embodiment of a slider form factor device in an open position.

DETAILED DESCRIPTION

Figure 1:
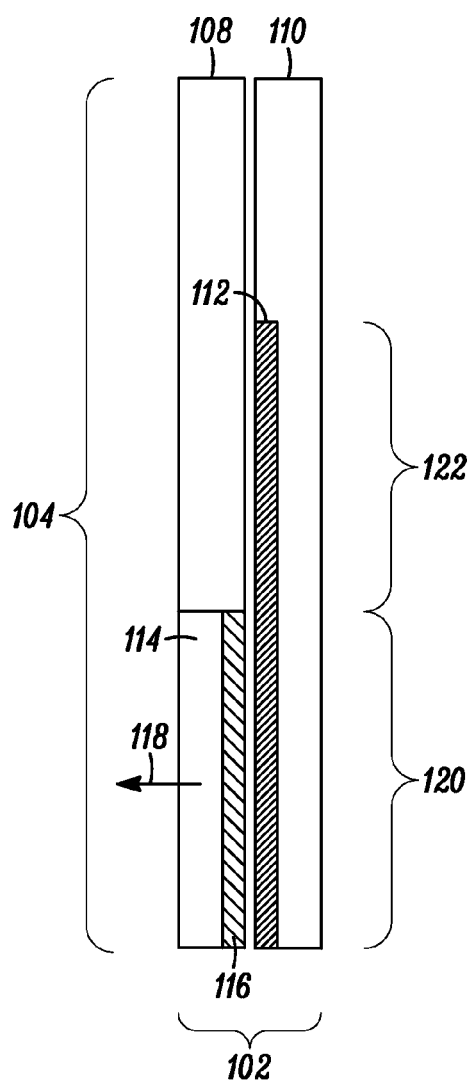
FIG. 1 illustrates a side view of an embodiment of a slider form factor device in a closed position.

A slider form factor device typically includes a main body, a sliding body slideably coupled to the main body, and a keypad module supported by the main body which is visible when the device is in the open position. It would be beneficial in a slider form factor mobile communication device to simplify the mechanical product layout to create more size compelling products.

Disclosed are slider form factor devices and methods of a slider form factor device having a transparent member supported by its sliding body, and a display module supported by its main body. The transparent member of the sliding body is on top of the display module of the main body when the device is in both the open position and in the closed position. The transparent member is configured to transmit light received from the display module therethrough. The transparent member provides a morphing effect as light emitted by the display module providing indicia is transmitted through the transparent member, the indicia exhibited through the transparent member changing from first indicia to different indicia depending upon the mode of the device.

The display module of the main body changes its exhibited indicia depending upon the position of the sliding body relative to the main body and/or the mode of the device. When the slider form factor device is in a closed position, the display module of the main body will exhibit first indicia so that the first indicia are visible through the transparent member. When the slider form factor device is in an open position and thus in a different mode, the display module of the main body will exhibit different indicia so that the different indicia are visible through the transparent member. In this way, the indicia of the transparent member on the sliding body morphs from first indicia to different indicia dependent upon whether the slider form factor device is in an open position or a closed position and/or dependent upon the mode of the device.

The display module of the main body is an input sensitive display module. In the open position of the device, the lower portion of the display module can exhibit a keypad for utilization of keypad input while the top portion of the display module can provide different indicia visible through the transparent member of the sliding body. The disclosed slider form factor device can enable a size and volume optimized product while simplifying at the same time the mechanical layout of the sliding components.

The instant disclosure is provided to explain in an enabling fashion the best modes of making and using various embodiments in accordance with the present invention. The disclosure is further offered to enhance an understanding and appreciation for the invention principles and advantages thereof, rather than to limit in any manner the invention. While the preferred embodiments of the invention are illustrated and described here, it is clear that the invention is not so limited. Numerous modifications, changes, variations, substitutions, and equivalents will occur to those skilled in the art having the benefit of this disclosure without departing from the spirit and scope of the present invention as defined by the following claims.

It is understood that the use of relational terms, if any, such as first and second, up and down, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. In the interest of brevity and minimization of any risk of obscuring the principles and concepts according to the present invention, discussion of such software and ICs, if any, is limited to the essentials with respect to the principles and concepts within the preferred embodiments.

Figure 2:
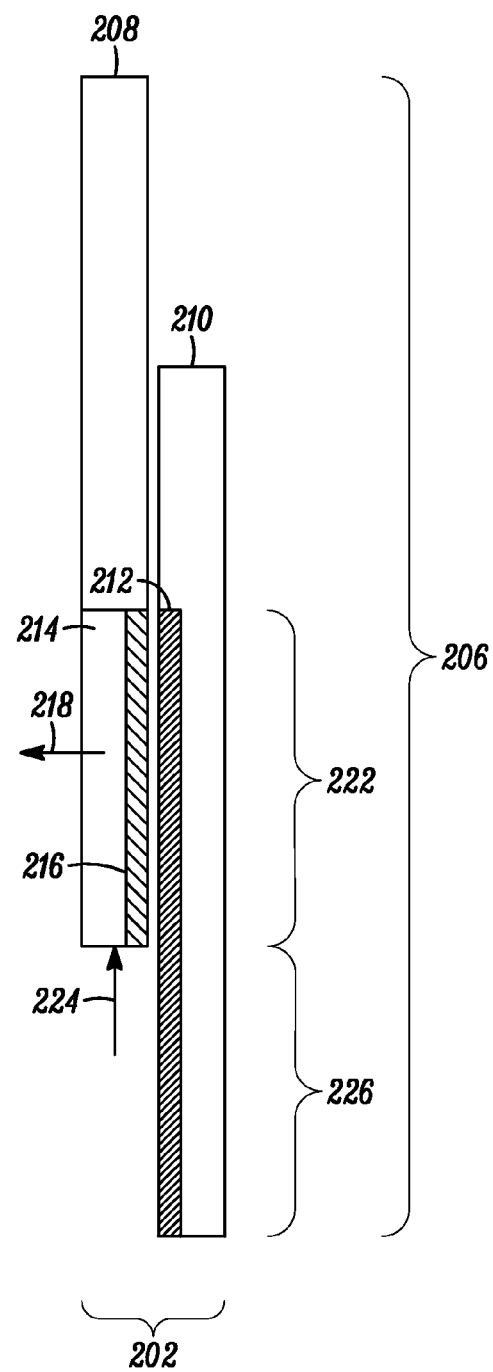
FIG. 2 illustrates a side view of an embodiment of a slider form factor device in an open position.

FIGS. 1 and 2 illustrate side view block diagrams of an embodiment of a slider form factor device depicted in two positions, a closed position and an open position. Referring to FIG. 1, the slider form factor device 102 is in the closed position 104. While the slider form factor device 102 is depicted as a mobile communication device in FIGS. 3 and 4, in particular a cellular telephone, it can be any type of slider form factor device. The mobile communication device 102 may be implemented as a cellular telephone (also called a mobile phone). The mobile communication device 102 represents a wide variety of devices that have been developed for use within various networks. Such handheld communication devices include, for example, cellular telephones, messaging devices, personal digital assistants (PDAs), notebook or laptop computers incorporating communication modems, mobile data terminals, application specific gaming devices, video gaming devices incorporating wireless modems, and the like. Any of these portable devices may be referred to as a mobile station or user equipment. Herein, wireless communication technologies may include, for example, voice communication, the capability of transferring digital data, SMS messaging, Internet access, multi-media content access and/or voice over internet protocol (VoIP).

The slider form factor device 102 includes a main body 110 and a sliding body 108 slideably coupled to the main body 110. A display module 112 is supported by the main body 110. The display module 112 can be an input sensitive display module. Any type of display module 112, such as polymer-dispersed liquid crystal (PDLC), twisted neumatic (TN)or a basic liquid crystal display (LCD), is within the scope of this discussion. A transparent member 114 including an input sensitive layer 116 is supported by the sliding body 108. The transparent member 114 may be composed of glass or plastic, which may be transparent or substantially transparent, such as including a tint. The input sensitive layer 116 can be a capacitive layer or any other type of input sensitive material. The transparent member 114 is configured to transmit light from the input sensitive display module 112 therethrough.

The transparent member 114 contains substantially transparent components, including the input sensitive layer 116 attached on the rear part of the transparent member 114. The input sensitive layer 116 slides with the transparent member 116 which, as discussed, is supported by the sliding body 110. Indicia or an image depicted on the display module 112 is visible through the transparent member 114. To conserve energy in the closed position 104, the portion 120 of the display module 112 may emit light 118 so that light indicated by arrow 118 is viewable through the transparent member 114 however, the portion 122 may be unutilized.

Referring to FIG. 2, the slider form factor device 202 is depicted in an open position 206. The arrow 224 illustrates the direction of movement of the slider form factor device 202 from the closed position 104 (see FIG. 1) to the open position 206. The slider form factor device 202 in the open position 206 is shown to include a main body 210 and a sliding body 208 slideably coupled to the main body 210. A display module 212 is supported by the main body 210. A transparent member 214 including an input sensitive layer 216 is supported by the sliding body 208.

The transparent member 214 is configured to transmit light from the display module 212 therethrough. In the open position 206, indicia or an image depicted on the display module 212 is visible through the transparent member 214. The portion 222 of the display module 212 may emit light indicated by arrow 218 so that it is viewable through the transparent member 214. Portion 226 of the display module 212 may exhibit a keypad in the open position 226, as is discussed below.

FIGS. 3 and 4 illustrate an embodiment of a slider form factor device is depicted in two positions, a closed position 304 and an open position 406. The slider form factor device is depicted as a cellular telephone. Referring to FIG. 3, the slider form factor device 302 includes a sliding body 308 slideably coupled to a main body 310. The transparent member 314 depicted at the bottom portion of the sliding body 308 shows indicia thereon. As discussed above, the indicia are actually displayed on the display module 112 (see FIG. 1) and the light 118 emitted from the display module 112 is viewable through the transparent member 314. In the example depicted, the transparent module 314 shows indicia 330, 332, 334, 336, 338 and 340 relating to a media playback mode of the device 302. The sliding body can further include a display 346 at its top portion. The display device 368 can provide, for example, menus as well as content, and the like when the device 302 is in media playback mode.

FIG. 4 the slider form factor device 402 is depicted in an open position 406. The arrow 424 illustrates the direction of movement of the slider form factor device 402 from the closed position 304 (see FIG. 3) to the open position 406. The slider form factor device 402 in the open position 406 is shown to include a main body 410 and a sliding body 408 slideably coupled to the main body 410. The transparent member 414 is supported by the sliding body 408. The display module 412 is supported by the main body 410.

In the open position 406, indicia 450, 452, 454, 456, 458, 460, 462 and 464 are depicted which may be, for example, navigation controls. Referring back to FIG. 3 showing indicia 330, 332, 334, 336, 338 and 340 (see FIG. 3) which may be, as mentioned, for example, media playback controls, the indicia in the closed position 304 is different from the indicia in the open position 406. In the closed position, the device may be in a different mode than the device in the open position. The indicia exhibited through the transparent member changes depending upon the mode of the device. It is understood that the device 302 can have more than one mode in the closed position and that the indicia can change with respect to the mode. It is further understood that the device 402 can have more than one mode in the open position and that the indicia can change with respect to the mode. The mode of media playback in the closed position 304 and the mode of navigation controls in the open position 406 are examples of modes in those two positions provided for illustrative purposes.

As discussed, in moving the sliding body in the direction of arrow 424, the mode of the slider form factor device 402 can change. The indicia exhibited on the display module 412 can include two portions 422 and 426, the portion 422 viewable through the transparent member 414, and the now exposed portion 426 viewable directly. Moving the sliding member in the direction of arrow 424 can enable a mode change of the device 402 different from that of the device 302 (see FIG. 3) in the closed position 304. In this way, to simplify a user interface of a device 402 to include particular features of interest depending on the mode of the device 402, the disclosed morphing effect changes the indicia transmitted through the transparent member 414.

In the open position, the display module 412 is partially exposed. The exposed portion 426 can exhibit a keypad. The non-exposed portion 422 of the display module, as discussed above, can exhibit different indicia than when the device 402 is in the closed position 304 (see FIG. 3). The different indicia 450, 452, 454, 456, 458, 460, 462 and 464 exhibited through the transparent member 414 in the open position 406 can provide, for example, navigation controls useful when the mobile communication device 402 is in communication mode. The keypad 466 exhibited on the portion 426 of on the display module 412 can be input sensitive. For example, the display modules 412 may include a capacitive layer, popples, and the like, to receive input.

Figure 5:
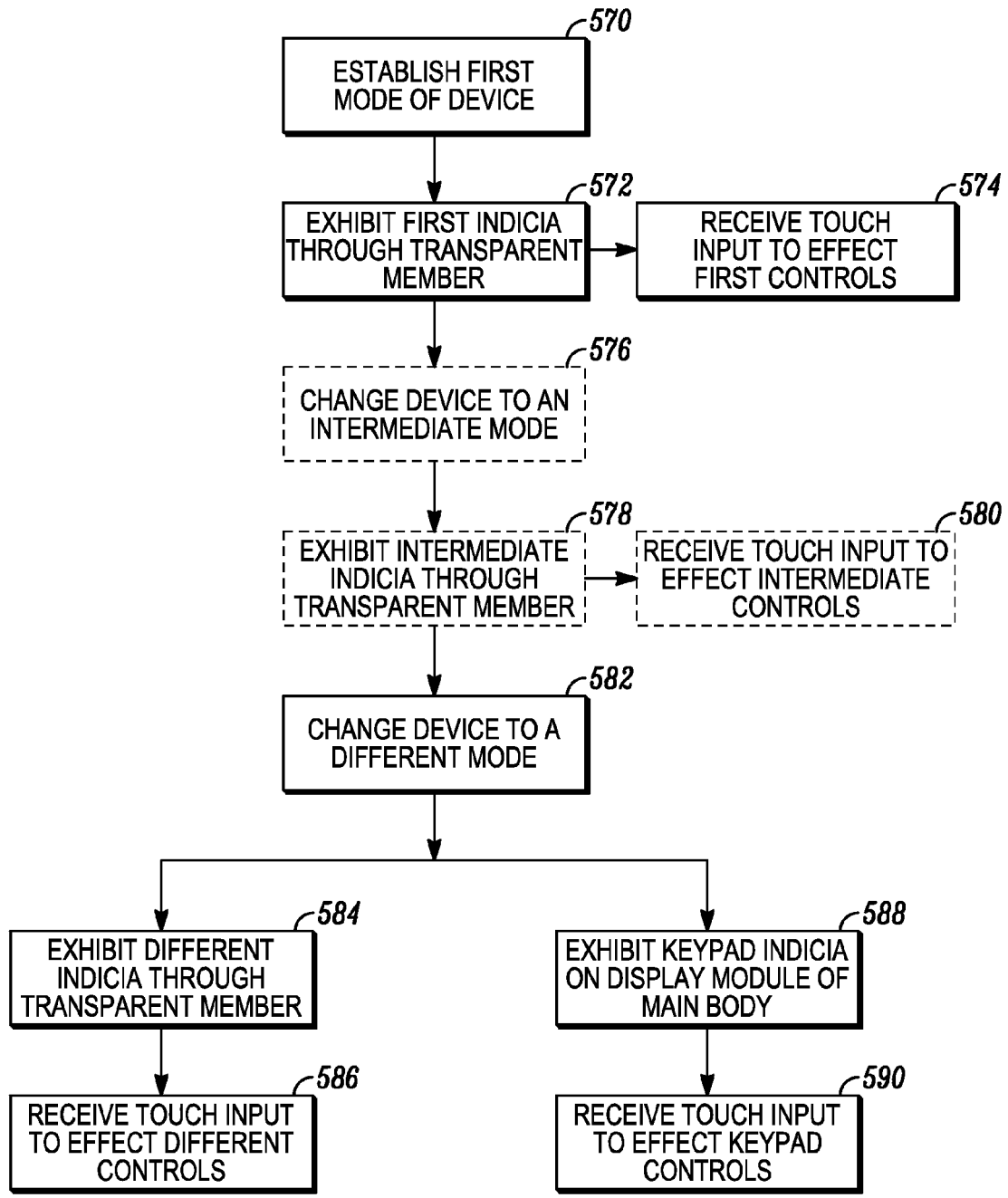
FIG. 5 is a flowchart of an embodiment of a method of the disclosed slider form factor device.

FIG. 5 is a flowchart of an embodiment of a method of the disclosed slider form factor device. A slider form factor device can rest 570 in the closed position so that in a first mode, it will exhibit 572 first indicia through the transparent member. The slider form factor device can receive 574 touch input to effect first controls, such as media playback controls. The device can be opened 476 to at least one optional intermediate position in another mode so that it will exhibit 478 intermediate indicia through the transparent member. The slider form factor device can receive 580 touch input to effect intermediate controls, which may be for example camera controls. The device can be opened 582 to an open position so that it is in a different mode and it will exhibit 584 different indicia through the transparent member. The device can receive 584 touch input to effect different controls, such as navigation controls. At the same time, when the device is in opened 582 to an open position, the display module of the main body can exhibit 588 keypad indicia. The device can receive 590 touch input to effect keypad controls. It is understood that the device need not be change from an open position to a closed position, or a closed position to an open position to change the mode of the device.

While morphing typically utilizes a shutter mechanism, the disclosed morphing mechanism changes the indicia, rather than hiding non-utilized indicia. The layout of the disclosed slider form factor device can enable a size and volume optimized product while simplifying at the same time the mechanical layout of the sliding components. The sliding body may be thinner that a device with a shutter mechanism due to a reduction in the number of components to carry out the disclosed morphing effect.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) was chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally and equitably entitled.

The invention claimed is:

1. A slider form factor device, comprising
a main body;
a sliding body slidably coupled to the main body, the sliding body including a top portion including a sliding body auxiliary display viewable directly in an open position and a closed position and a bottom portion with a transparent member only positioned at the bottom portion of the sliding body;
a display module supported by the main body, the display module including a first upper portion and a second lower portion, the first upper portion viewable through the transparent member and the second lower portion being exposed and viewable directly in the open position;
the transparent member including an input sensitive layer supported by the sliding body, the transparent member configured to transmit light from the display module therethrough, wherein the display module changes indicia exhibited depending upon which one of the plurality of slide positions the sliding body assumes with respect to the main body, including a closed position wherein the display module exhibits a first indicia including media playback control indicia visible through the transparent member and an open position wherein a different indicia including at least one of a keypad indicia and navigation control indicia is visible through the transparent member.

2. The device of claim 1 wherein the input sensitive layer is a capacitive layer.

3. The device of claim 1 wherein the display module is an input sensitive display module.

4. The device of claim 3 configured to assume a closed position wherein the input sensitive display module exhibits first indicia.

5. The device of claim 3 configured to an open position wherein the input sensitive display module exhibits different indicia.

6. The device of claim 3 configured to be opened to an intermediate position where the input sensitive display module exhibits intermediate indicia.

7. The device of claim 6 wherein intermediate indicia is camera controls indicia.

8. The device of claim 1 wherein the transparent member includes a front surface and a back surface, the back surface opposite the main body, and wherein the input sensitive layer is adjacent the back surface.

9. The device of claim 1 wherein the sliding body includes a top portion and a bottom portion, wherein an auxiliary display device is positioned at the top portion.

10. A slider form factor device, comprising
a main body;
a sliding body slideably coupled to the main body, the sliding body including a top portion including a sliding body auxiliary display viewable directly in an open position and a closed position and a bottom portion with a transparent member only positioned at the bottom portion of the sliding body;
a display module supported by the main body, the display module including a first upper portion and a second lower portion, the first upper portion viewable through the transparent member and the second lower portion being exposed and viewable directly in the open position;
a transparent member including an input sensitive layer supported by the sliding body, the transparent member configured to transmit light from display module therethrough wherein the display module changes indicia exhibited thereon depending upon which one of the plurality of slided positions the sliding body assumes with respect to the main body, including the closed position wherein the display module exhibits a first indicia including media playback control indicia visible through the transparent member and the open position wherein a different indicia including at least one of a keypad indicia and navigation control indicia visible through the transparent member.

11. The device of claim 10 wherein the input sensitive layer is a capacitive layer.

12. The device of claim 10 wherein the display module is an input sensitive display module.

13. The device of claim 10 configured to an open position wherein the display module exhibits keypad indicia and navigation controls indicia.

14. A method of changing indicia exhibited on a device, the method comprising:
providing a slider form factor device, comprising a main body; a sliding body slidably coupled to the main body, the sliding body including a top portion including a sliding body auxiliary display viewable directly in an open position and a closed position and a bottom portion with a transparent member only positioned at the bottom portion of the sliding body; a display module supported by the main body, the display module including a first upper portion and a second lower portion, the first upper portion viewable through the transparent member and the second lower portion being exposed and viewable directly in the open position; the transparent member including an input sensitive layer supported by the sliding body, the transparent member configured to transmit light from the display module therethrough, wherein the display module changes indicia exhibited depending upon which one of the plurality of slide positions the sliding body assumes with respect to the main body;

in the closed position, exhibiting a first indicia on the display module so that the first indicia is visible through the transparent member, the first indicia comprising media playback control indicia; and in the open position, exhibiting a different indicia on the display module so that the different indicia is visible through the transparent member, the different indicia including at least one of a keypad indicia and navigation control indicia.

* * * * *